United States Patent [19]

Iwashita

[11] Patent Number: 5,204,602
[45] Date of Patent: Apr. 20, 1993

[54] SERVOMOTOR CONTROL METHOD
[75] Inventor: Yasusuke Iwashita, Oshino, Japan
[73] Assignee: Fanuc Ltd, Minamitsuru, Japan
[21] Appl. No.: 741,447
[22] PCT Filed: Dec. 10, 1990
[86] PCT No.: PCT/JP90/01608
  § 371 Date: Aug. 12, 1991
  § 102(e) Date: Aug. 12, 1991
[87] PCT Pub. No.: WO91/09358
  PCT Pub. Date: Jun. 27, 1991

[30] Foreign Application Priority Data
Dec. 12, 1989 [JP] Japan .................................. 1-320552
Jan. 19, 1990 [JP] Japan ..................................... 2-8347
[51] Int. Cl.⁵ ............................................. G05B 11/01
[52] U.S. Cl. ..................... 318/630; 318/568.22;
  318/561; 318/632; 364/566
[58] Field of Search ............... 318/560, 561, 563–565,
  318/630, 600, 601, 611, 632, 568.1, 568.11,
  568.17, 568.18, 568.22, 571–572; 388/902, 903;
  364/513

[56] References Cited
U.S. PATENT DOCUMENTS

| | | | |
|---|---|---|---|
| 4,042,869 | 8/1977 | Eickelberg et al. | 318/630 |
| 4,507,595 | 3/1985 | Rozsa | 318/630 |
| 4,857,816 | 8/1989 | Rogozinski et al. | 318/630 X |
| 4,890,046 | 12/1989 | Kurakake et al. | 318/600 X |
| 4,914,370 | 4/1990 | Sakamoto et al. | 318/618 X |
| 4,916,375 | 4/1990 | Kurakake et al. | 318/603 X |
| 5,015,935 | 5/1991 | Iwashita | 318/630 |
| 5,101,146 | 3/1992 | Teshima | 318/603 X |

Primary Examiner—William M. Shoop, Jr.
Assistant Examiner—David Martin
Attorney, Agent, or Firm—Staas & Halsey

[57] ABSTRACT

A servomotor control method capable of automatically effecting optimum backlash acceleration correction under various machine operating conditions. A backlash acceleration correction process is started when the sign of a positional deviation is inverted, and is cyclically executed thereafter. A cutting speed is estimated from the square root of the positional deviation at the start of the correction process, and a constant, used to calculate a backlash acceleration amount, and a backlash acceleration time are calculated in accordance with the estimated cutting speed. By inverting the sign of the output of an integrator (2) of a speed loop, moreover, a target value is obtained which is equal in magnitude to the integrator output and whose sign is opposite to that of the integrator output. In each processing cycle, the product of the constant and the difference between the target value and the present integrator output is obtained, and a torque command (VCMD) to be used for the drive control of a servomotor is obtained in accordance with a speed command after the backlash acceleration correction, which is obtained by adding the resultant product to a speed command (TCMD) calculated in a position loop process.

6 Claims, 6 Drawing Sheets

SERVOMOTOR CONTROL METHOD

TECHNICAL FIELD

The present invention relates to a control method for a servomotor for driving a feed screw, and more particularly, to a method for controlling the drive of the servomotor so that a feed delay caused at the time of the reversal of the feed screw due to backlash of the feed screw can be eliminated.

BACKGROUND ART

In a machine having a movable part arranged to be reciprocated along each of one or more feed screws, typically, each feed screw is rotated in a desired direction by means of a corresponding servomotor, which is drivingly controlled by a servo system, so as to move the machine movable part in desired directions along the feed screws, in order to perform a desired operation. When the moving direction of the movable part is reversed, however, the movable part sometimes cannot accurately follow up a command for movement, due to backlash of the feed screws or the like, thus failing to perform the desired operation with accuracy.

In machining a workpiece into a hollow cylinder, for example, servomotors for X and Y axes typically are rotated so that a cutting tool mounted on a tool table moves relatively to the workpiece along a tool path within an XY plane. In doing this, the cutting tool on the Y axis is first moved in the negative direction along the X axis, as well as in the negative direction along the Y axis, in order that it is moved along the tool path within the second quadrant of the XY plane, for example. Then, the tool is moved in the positive direction along the X axis, as well as in the negative direction along the Y axis, in order that it is moved within the third quadrant of the XY plane. Further, the tool is moved in the fourth and first quadrants of the XY plane. When the tool transfers between the adjacent quadrants, a positional deviation in the servo system corresponding to the axis (feed screw) associated with the reverse movement of the tool is generally reduced to zero, and a torque command from the servo system is reduced, while a frictional force produced in the mechanical system acts in different directions before and after the transfer. Thus, when the tool transfers between the adjacent quadrants, the servomotor cannot immediately produce an output torque great enough to resist the frictional force, so that the servomotor sometimes cannot be reversed at once. When the tool transfers from the second quadrant to the third, for example, the reversal of the X-axis motor may suffer a delay. Since the feed screws of the tool table are subject to backlash, moreover, the tool table sometimes cannot follow up the movement command during the transfer between the quadrants, so that the reverse movement of the table is delayed. If the follow-up performance is lowered in this manner, the cutting work is insufficient, so that projections are formed on the machined surface of the workpiece.

Figure 8:
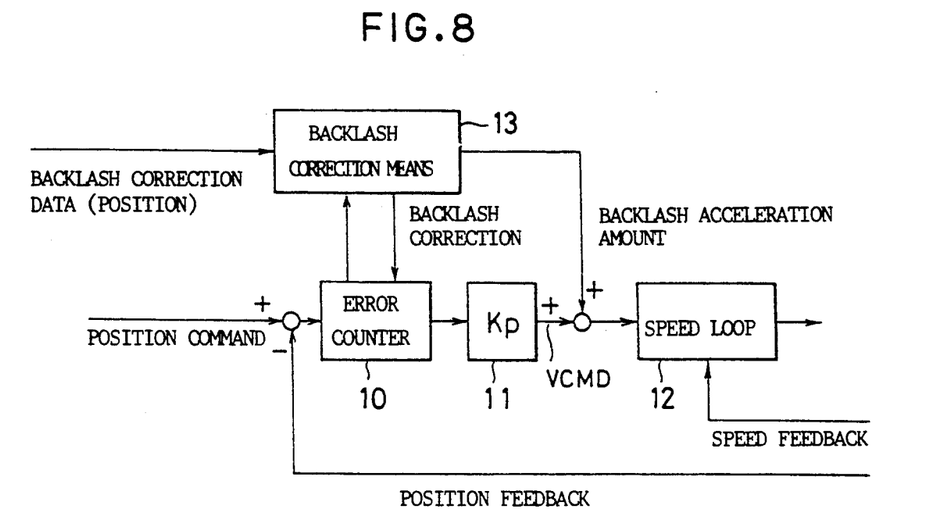
FIG. 8 is a block diagram showing a digital servo circuit for executing conventional backlash correction and backlash acceleration correction.

Conventionally, in order to eliminate these problems, backlash correction and backlash acceleration correction are effected in the servo system when the servomotor is reversed from a first rotating direction to a second rotating direction. For example, a conventional digital servo circuit (FIG. 8), which is provided with a processor for executing position, speed and current loop processes on software-basis in response to a position command from a numerical control device having a computer built-in, is arranged to receive backlash correction data which is delivered from the control device when the sign of the position command is inverted. When the correction data is inputted, the processor which functions as backlash correction means 13 adds this correction data to a value (positional deviation) stored in an error counter 10. Then, the processor which functions as position loop means 11 multiplies the positional deviation after the correction by a position gain Kp, thereby generating a speed command VCMD. Further, the processor which functions as speed loop means 12 and current loop means (not shown) successively executes the speed and current loop processes in accordance with a speed command after the correction obtained by adding a backlash acceleration amount to the speed VCMD, thereby acceleratively operating the servomotor in the second rotating direction.

The backlash acceleration correction is intended to compensate the motor reversal delay attributable to the backlash and frictional force of the mechanical system caused when the servomotor is reversed. To attain this, the backlash acceleration amount, backlash acceleration start timing, and backlash acceleration time must be set properly. If these parameters are improper, the stroke of the cutting tool may be too long or too short, so that projections and recesses are formed on the machined surface of the workpiece. If the backlash acceleration correction is executed simultaneously with the entry of the backlash correction data, for example, the backlash acceleration correction is started before the sign of the speed command VCMD is inverted, and the servomotor is reversed before a predetermined timing for the start of the motor reversal. Thus, the amount of feed of the cutting tool is excessive, so that recesses are formed on the workpiece. Recesses are formed also if the backlash acceleration amount is excessive.

In order to rationalize the backlash acceleration start timing, therefore, the backlash acceleration correction is conventionally started after it is concluded that the motor reversal timing is reached when the sign of the positional deviation is inverted. Further, the backlash acceleration amount and the backlash acceleration time are determined by trial and error in a manner such that the speed command after the correction agrees with an ideal speed command which is given by the product of the position gain Kp and a positional deviation e(t), represented as a function of the time t elapsed after the inversion of the sign of the positional deviation. The backlash acceleration correction is finished when position feedback pulses of a number corresponding to the acceleration time thus determined are inputted.

As described above, the optimum values of the parameters, such as the backlash acceleration amount, acceleration time, etc., must be strictly determined, and these optimum values change depending on cutting conditions (generally, machine operating conditions) which include the cutting speed. Conventionally, on the other hand, the optimum values of the backlash acceleration correction parameters are determined by trial and error, so that it is difficult to set the parameter values.

DISCLOSURE OF THE INVENTION

The object of the present invention is to provide a servomotor control method capable of automatically effecting optimum backlash acceleration correction under various machine operating conditions.

In order to achieve the above object, according to the present invention, there is provided a servomotor control method for a servo system which has a speed loop for obtaining an integral term in accordance with a speed command and an actual speed, and which is arranged to control a servomotor for rotating a feed screw of a machine. The control method comprises the steps of: (a) determining a target value which is equal in magnitude to the integral term obtained at an instant immediately after reversal of rotating direction of the feed screw, and which has a sign opposite to that of the integral term; (b) repeatedly determining a backlash acceleration amount until a predetermined period has elapsed from the instant immediately after the reversal of the feed screw rotating direction, said backlash acceleration amount gradually changing from the integral term to the target value with passage of time after the instant immediately after the reversal of the feed screw rotating direction; and (c) during the predetermined period, repeatedly correcting the speed command in accordance with the backlash acceleration amount.

Preferably, the control method is applied to a servo system for cyclically executing a speed loop process, and includes the steps of (b1) determining the integral term in each of the speed loop processes within the predetermined period, and (b2) determining the backlash acceleration amount in each speed loop process on the basis of an intermediate target value which is obtained by subtracting the integral term obtained in each speed loop process from the target value. More preferably, the backlash acceleration amount is determined by multiplying the intermediate target value by a predetermined coefficient, the predetermined coefficient preferably being proportional to a cutting speed used immediately after the reversal of the feed screw rotating direction. Preferably, the control method is applied to a servo system for cyclically executing a position loop process in accordance with a position command and an actual position, and the predetermined coefficient is proportional to the square root of a positional deviation obtained when the sign of the position command is inverted. Preferably, the predetermined period is decided in accordance with the predetermined coefficient.

According to the present invention, as described above, the target value which has the magnitude equal to that of the integral term obtained immediately after the reversal of the feed screw rotating direction and which has the sign opposite to that of the integral term is obtained, and, during the predetermined period immediately after the reversal of the feed screw rotating direction, the speed command is repeatedly corrected in accordance with the backlash acceleration amount which gradually changes from the integral term to the target value with the passage of time. Thus, an optimum value of the backlash acceleration amount can be determined automatically, and optimum backlash acceleration correction can be automatically effected under various machine operating conditions. Therefore, in the case of machining a workpiece into a cylindrical shape by moving a tool or the workpiece in a machine tool to which the method of the present invention is applied, for instance, the tool or the workpiece can be accurately moved along a predetermined path while satisfactorily following a movement command, so that projections or recesses can be prevented from being formed on the machined surface of the workpiece.

BEST MODE OF CARRYING OUT THE INVENTION

A servo system for embodying a servomotor control method of an embodiment of the present invention comprises a digital servo circuit or the like which executes position, speed and current loop processes on software-basis in response to a position command supplied from a numerical control device or the like of a type having a built-in computer. In other words, this servo system functionally comprises a position loop which includes a speed loop and a current loop as its minor loops. The servo system of the present embodiment is mounted on a machine tool which is provided with X- and Y-axis servomotors for rotating X- and Y-axis feed screws, respectively, of a tool table which is fitted with a cutting tool.

Figure 2:
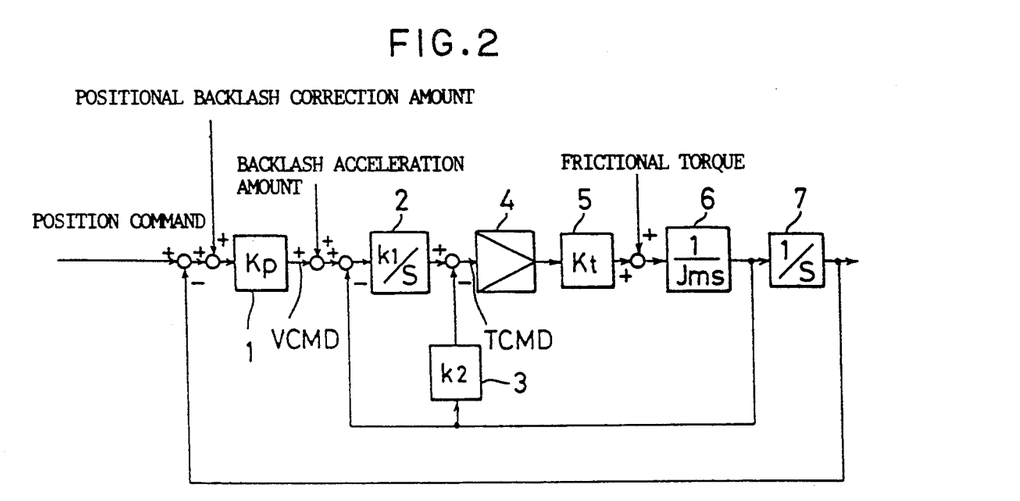
FIG. 2 is a block diagram of a servo system for embodying the method of the present invention.

In a servo system of FIG. 2 which corresponds to the X- and Y-axis servomotor, a backlash correction amount is added, where required, to a deviation (positional deviation) between a position feedback signal which, indicative of an actual motor rotational position, is delivered from a detector represented by a seventh block 7, and a position command. In a first block 1, the positional deviation or a positional deviation obtained after the backlash correction is multiplied by a position gain Kp, and a backlash acceleration amount is added, where required, to the resulting speed command VCMD. Then, in an integrator represented by a second block 2, a deviation between the speed command or a speed command obtained after the backlash acceleration correction and a speed feedback signal, indicative of an actual motor speed, is integrated with an integral gain K1, while the speed feedback signal is multiplied by a proportional gain K2 in a third block 3. Then, the output of the third block 3 is subtracted from the output of the second block 2 to obtain a torque command TCMD. In other words, integral-plus-proportional control is executed in the speed loop process. Further, in response to the torque command TCMD, a current loop represented by a fourth block 4 and a current amplifier (e.g., PWM inverter) control the drive of a servomotor represented by fifth and sixth blocks 5 and 6. Symbols Kt and Jm designate the torque constant and inertia of the servomotor.

Figure 3:
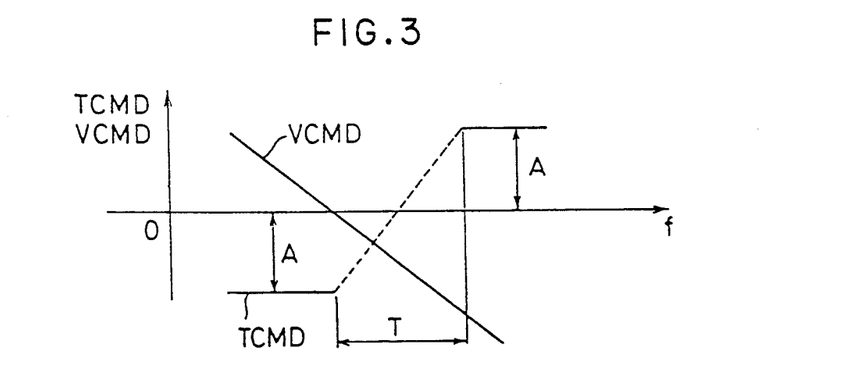
FIG. 3 is a graph showing changes of a speed command and a torque command obtained at the time of the reversal of a feed screw.
Figure 4:
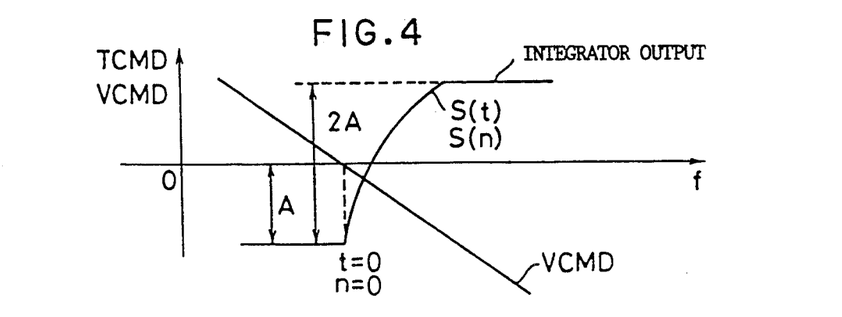
FIG. 4 is a graph showing changes of the speed command and an integrator output (torque command) according to the present invention obtained at the time of the reversal of the feed screw.

In the servo system of FIG. 2, the variation of the position command gradually decreases immediately before the rotating direction of the feed screw of the tool table is reversed, so that the positional deviation is reduced in general. As this is done, the respective absolute values of the speed command VCMD and the speed feedback signal are reduced to approach the value "0." At this time, a frictional force A to act in a first direction against the motor rotation is produced in the mechanical system, and the servomotor produces an output torque to resist this frictional force A (FIGS. 3 and 4). The speed loop output or torque command TCMD obtained when the motor speed is "0" is represented by the output (integral term) of the integrator 2, since the output (proportional term) of the block 3 at that time takes the value "0."

Subsequently, a position command whose changing direction is inverted to reverse the feed screw is delivered from the numerical control device, and the backlash correction amount is added to the positional deviation to compensate for a reversal delay of the feed screw attributable to backlash thereof. If it is concluded that the sign of the positional deviation is inverted as the motor rotates reversely, thereafter, backlash acceleration correction is effected such that the integrator output (torque command TCMD) changes along the curve shown in FIG. 4. More specifically, a target value is first set which is equal in magnitude to the integrator output immediately before the reversal of the feed screw and whose sign is opposite to that of the integrator output. Then, in each of speed loop processes repeatedly executed within a predetermined time T, a backlash acceleration amount is calculated which is equal to the product of a constant k (0<k<1) and a valve obtained by subtracting the present integrator output from the target value. Then, in each speed loop process, the speed command VCMD is corrected by the use of the backlash acceleration amount thus calculated.

As a result, within the predetermined time T after the start of the reverse rotation, the servomotor is enabled to produce a motor output torque great enough to resist the frictional force A which acts in a second direction opposite to the first direction. Thus, the motor is rapidly reversed for a backlash section in which no substantial frictional force acts, so that the backlash is quickly compensated, whereby there are no machining errors attributable to the backlash. Within the predetermined time after the start of the reverse motor rotation, moreover, the torque command TCMD never overshoots with respect to the frictional force A, so that no machining errors are caused by excessive backlash acceleration correction.

In the present embodiment, moreover, in order to effect suitable backlash acceleration correction based on machine operating conditions, e.g., a cutting speed used at the time of reversal of the feed screw, the constant k and the backlash acceleration time T, which are used to determine the backlash acceleration amount in each speed loop process, are individually set in dependence on the cutting speed. In the following, an explanation will be given on this point.

In cyclically sampling the integrator output on and after the start of the reversal of the feed screw, an integrator output S(n) for an n'th sampling cycle is given by equation (1). If the reversal time constant of the integrator output is $\tau$, an integrator output S(t) for the time point at which time t has elapsed after the start of the reversal of the feed screw is given by equation (2).

$$S(n + 1) = S(n) + k(A - S(n)) \quad (1)$$
$$= (1 - k)S(n) + kA.$$
$$S(t) = A(1 - 2e^{-t/\tau}). \quad (2)$$

If the sampling cycle is $\Delta t$, equation (3) is derived from equation (2).

$$S(t + \Delta t) = A(1 - 2e^{-(t+\Delta t/\tau)}) \quad (3)$$
$$= e^{-\Delta t/\tau} \cdot S(t) + A(1 - e^{-\Delta t/\tau}).$$

If $S(t+\Delta t)=S(n+1)$ and $S(t)=S(n)$ are given, equations (4) to (6) are derived from equations (1) and (3). Symbol ln designates a natural logarithm.

$$1-k=e^{-\Delta t/\tau}. \quad (4)$$

$$k=1-e^{-\Delta t/\tau}. \quad (5)$$

$$\tau=\Delta t/ln\{1/(1-k)\}. \quad (6)$$

Figure 5:
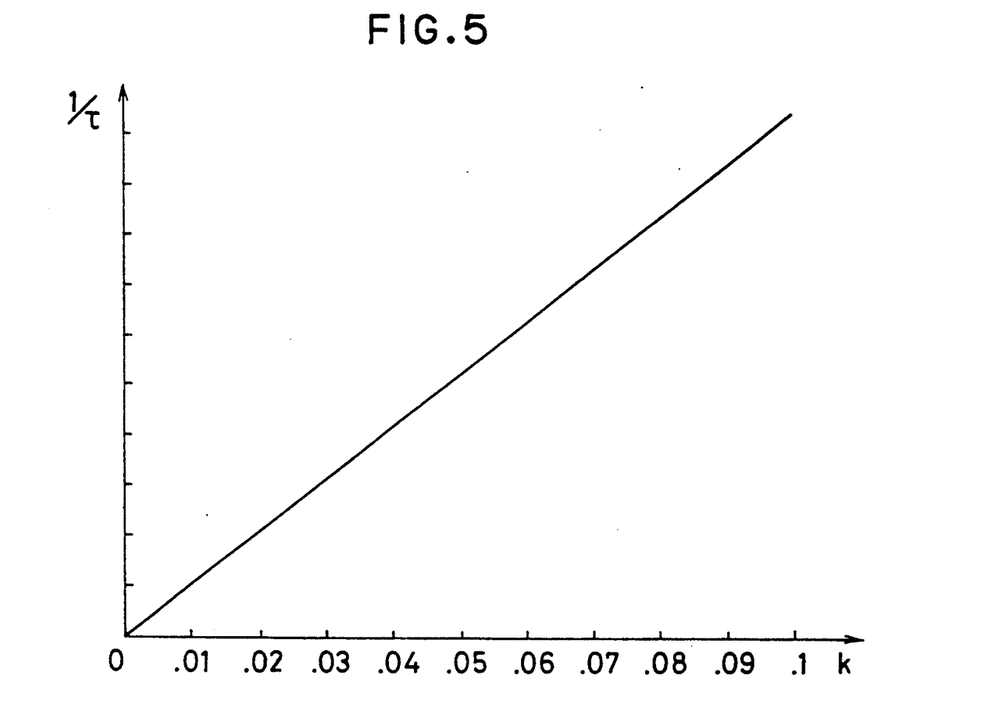
FIG. 5 is a graph showing the relationship between a constant k used for backlash acceleration correction and the reciprocal $1/\tau$ of a reversal time constant of the integrator output.

As seen from FIG. 5 which corresponds to equation (6), the reciprocal $1/\tau$ of the reversal time constant $\tau$ of the integrator output and the constant k for the calculation of the backlash acceleration amount are proportional to each other. Preferably, the higher the cutting speed during the reversal of the feed screw, the more quickly the feed screw should be reversed. In other words, it is advisable to reduce the time constant $\tau$ in proportion to the increase of the cutting speed. To attain this, the constant k is set so that it changes in proportion to the cutting speed, whereby the time constant $\tau$ is reduced in proportion to the increase of the cutting speed. The backlash acceleration time T is set at a value twice or thrice that of the time constant $\tau$. If the sampling cycle $\Delta t$ is about 1 msec, the constant k set at about 0.1 at the most.

In the present embodiment, moreover, the cutting speed is estimated from the positional deviation if it cannot be directly discriminated in the servo system.

The following is a description of the reason why the cutting speed can be estimated from the positional deviation.

Figure 6:
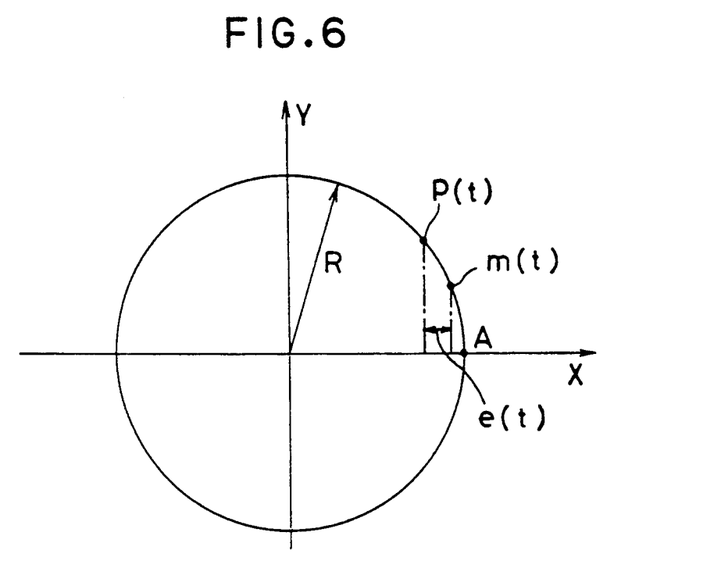
FIG. 6 is a diagram for illustrating the way of machining a workpiece into a cylinder.

In moving the cutting tool, mounted on the tool table for use as a machine movable part, on an XY plane to machine a workpiece into a cylinder with a radius R, as shown in FIG. 6, a position command m(t) with respect to the X axis is given by equation (7), where the time elapsed after the passage of the tool through a point A and the angular velocity are t and $\omega$, respectively. If the actual position of the tool in the X-axis direction is P(t), moreover, a positional deviation e(t) in the X-axis direction is given by equation (8). Further, equation (9) is obtained by subjecting equation (8) to Laplace transform.

$$m(t) = R\cos\omega t, \tag{7}$$

$$e(t) = m(t) - P(t), \tag{8}$$

$$E(S) = M(S) - P(S). \tag{9}$$

Figure 7:
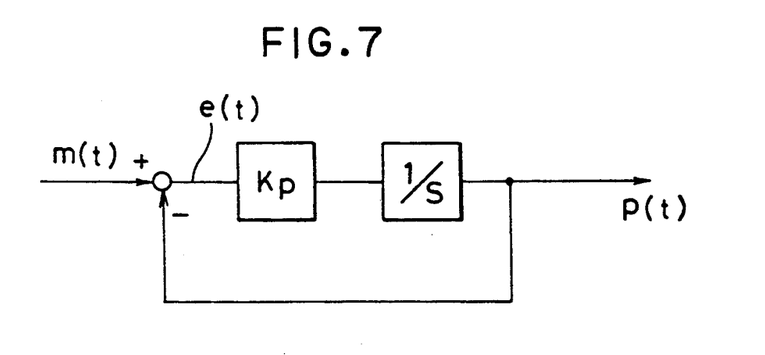
FIG. 7 is a block diagram briefly illustrating the servo system.

In the block diagram of FIG. 7 briefly illustrating the servo system of FIG. 2, $P(S) = (Kp/S) \cdot E(S)$ is satisfied, so that equation (10) is obtained from equation (9). Transforming equation (10), we obtain equation (11).

$$P(S) = (K/S) \cdot (M(S) - P(S)), \tag{10}$$

$$P(S) = \{Kp/(S+Kp)\} \cdot M(S). \tag{11}$$

Subjecting equation (7) to Laplace transform, moreover, we obtain $$\begin{aligned}M(S) &= L[m(t)] \\ &= L[R\cos\omega t] \\ &= L[(R/2) \cdot (e^{j\omega t} + e^{-j\omega t})] \\ &= (R/2) \cdot \int_0^\infty (e^{j\omega t} \cdot e^{-st} + e^{-j\omega t} \cdot e^{-st}) dt \\ &= (R/2)[\{1/(S - j\omega)\} + \{1/(S + j\omega)\}] \\ &= \{R \cdot S\}/\{(S^2 + \omega^2)\}.\end{aligned} \tag{12}$$

Substituting equation (12) into equation (11), we obtain equation (13). Transforming equation (13), we obtain equation (14).

$$P(S) = R \cdot \{S/(S^2+\omega^2)\} \cdot \{Kp/(S^2+\omega^2)\}, \tag{13}$$

$$P(S) = R[\{a/(S+Kp)\} + \{b/(S+j\omega)\} + \{c/(S-j\omega)\}]. \tag{14}$$

Regarding the respective right sides of equations (13) and (14) as equal, we obtain $$\begin{aligned}&a(S^2+\omega^2) + b(S+Kp)\cdot(S-j\omega) \\ &+ c(S+Kp)\cdot(S+j\omega) = Kp \cdot S.\end{aligned} \tag{15}$$

Rearranging equation (15), we obtain $$(a+b+c)S^2 + \{(Kp-j\omega)b + (Kp+j\omega)c\}S + j\omega Kp(c-d) + a\omega^2 = Kp \cdot S. \tag{16}$$

From equation (16), we obtain equations (17) to (19).

$$a+b+c = 0, \tag{17}$$

$$(Kp-j\omega)b + (Kp+j\omega)c = Kp, \tag{18}$$

$$j\omega Kp(c-b) + a\omega^2 = 0. \tag{19}$$

Solving equations (17) to (19), we obtain $$a = -Kp^2/(Kp^2+\omega^2), \tag{20}$$

$$b = Kp(Kp+j\omega)/2(Kp^2+\omega^2), \tag{21}$$

$$c = Kp(Kp-j\omega)/2(Kp^2+\omega^2). \tag{22}$$

Substituting equations (20) to (22) into equation (14), we obtain $$\begin{aligned}P(S) = &R[\{-Kp^2/(K^2+\omega^2)\} \cdot \{1/(S+Kp)\} + \\ &\{Kp(Kp+j\omega)/2(Kp^2+\omega^2)\} \cdot \{1/(S+j\omega)\} + \\ &\{Kp(Kp-j\omega)/2(Kp^2-\omega^2)\} \cdot \{1/(S-j\omega)\}.\end{aligned} \tag{23}$$

Subjecting equation (23) to inverse Laplace transform, we obtain $$\begin{aligned}P(t) = L^{-1}[P(S)] = &[\{Kp^2/(Kp^2+\omega^2)\} \cdot e^{-Kpt} + \{Kp/2(Kp^2+\omega^2)\} \cdot \{(Kp+j\omega)e^{-j\omega t} + (K-j\omega)e^{j\omega t}\}]R \\ = &[\{Kp^2/(Kp^2+\omega^2)\} \cdot e^{-Kpt} + \{Kp/2(Kp^2+\omega^2)\} \cdot (Kp\cos\omega t + \omega\sin\omega t)]R.\end{aligned} \tag{24}$$

In a steady state, the first term of the right side of equation (24) is "0." Substituting equation (24) obtained at that time into equation (8), we obtain equation (25).

$$\begin{aligned}e(t) &= m(t) - P(t) \\ &= [\cos\omega t - \\ &\{Kp/(Kp^2+\omega^2)\} \cdot (Kp\cos\omega t + \omega\sin\omega t)]R.\end{aligned} \tag{25}$$

Substituting t=0 into equation (25), we obtain equation (26) which is indicative of a positional deviation e(0) obtained when the changing direction of the position command is reversed at the point A of FIG. 6, for example. Since a variable "$\omega/Kp$" in this equation is about $10^{-2}$ at the most, equation (26) can be approximated in equation (27).

$$\begin{aligned}e(0) &= R\omega^2/(Kp^2+\omega^2) \\ &= R(\omega/Kp)^2/\{1+(\omega/Kp)^2\},\end{aligned} \tag{26}$$

$$e(0) \approx R(\omega/Kp)^2. \tag{27}$$

After all, the cutting speed during the reversal of the changing direction of the position command corresponding to the angular velocity $\omega$ is proportional to the square root of the positional deviation e(0) for the time point concerned, so that it can be estimated from the positional deviation.

Figure 1:
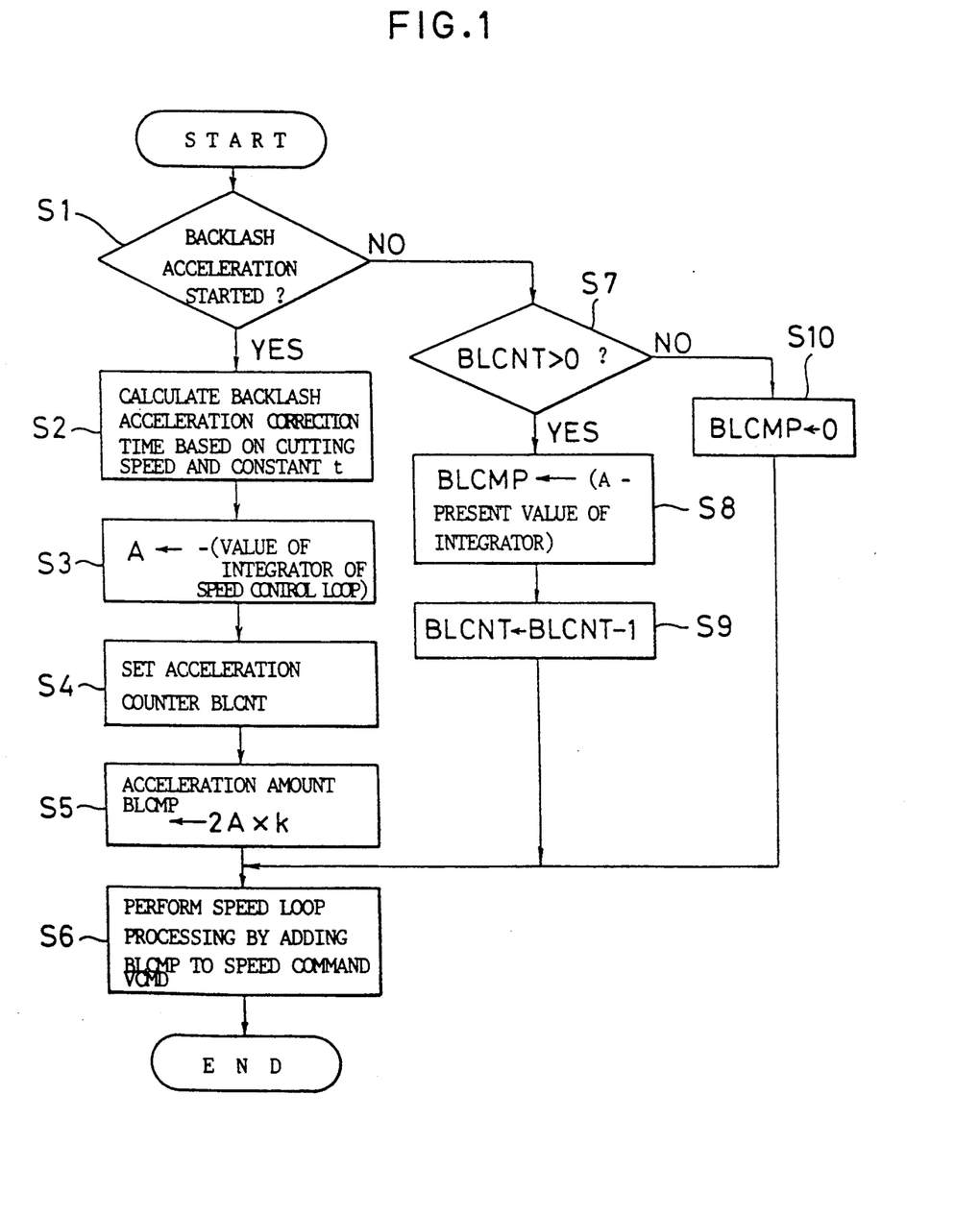
FIG. 1 is a flow chart illustrating a backlash acceleration correction process executed by a servomotor control method according to one embodiment of the present invention.

Referring now to FIG. 1, a backlash acceleration correction process, which is cyclically executed by means of a processor of the digital servo circuit corresponding to the servo system of FIG. 2, will be described.

In each processing cycle, the processor determines whether or not the sign of a positional deviation stored in an error counter is inverted, thereby determining whether or not the timing for the start of the backlash acceleration correction is reached (Step S1). If the decision is positive, the constant k, used for the calculation of the backlash acceleration amount, and the backlash acceleration time T are calculated in accordance with the cutting speed at the time point concerned (Step S2). If the cutting speed at the start of the backlash acceleration correction is unknown, the cutting speed is estimated from the square root of the positional deviation e(0) for that time, and the parameters k and T for Step S2 are calculated in accordance with the estimated cutting speed.

Then, the processor reads out the integral term (integrator output) obtained in the speed loop process from an accumulator which functions as an integrator for the speed loop. By inverting the sign of the value thus read out, a target value A is obtained which is equal in magnitude to the integral term and whose sign is opposite to that of the integral term. This target value A is set in a register built in the processor (Step S3), and the backlash acceleration time T obtained in Step S2 is set in an acceleration counter BLCNT (Step S4). Then, the processor doubles the target value A, thereby obtaining the difference between the target value A and the present integrator output. Further, the processor obtains the product of this difference and the constant k obtained in Step S2, and loads the product 2A·k into an acceleration amount register BLCMP (Step S5). Then, the processor adds the product 2A·k to the speed command VCMD calculated in the position loop process, thereby subjecting the speed command to backlash acceleration correction. Further, the processor performs speed loop processing in accordance with a speed command after the correction, thereby obtaining the torque command TCMD (Step S6), whereupon the backlash acceleration correction process for the present cycle ends.

The decision at Step S1 in the next processing cycle becomes negative, whereupon the program proceeds to Step S7. In Step S7, the processor determines whether or not the value stored in the acceleration counter BLCNT is positive (Step S7). If it is concluded that the counter value is positive so that the backlash acceleration correction is being undergone, the processor multiplies a value obtained by subtracting the present integrator output from the target value A by the constant k, thereby obtaining the backlash acceleration amount for the present processing cycle, and loads the obtained value into the register BLCMP (Step S8). After "1" is then subtracted from the value stored in the acceleration counter BLCNT in Step S9, the program proceeds to Step S6, whereupon the speed loop processing is executed.

Subsequently, the aforementioned series of processes (Steps S1, S7 to S9, and S6) are repeated. If it is concluded in Step S7 of the subsequent processing cycle that the value in the acceleration counter BLCNT is not positive, the processor loads the value "0" into the acceleration amount register BLCMP, and then executes Step S6. As a result, normal speed loop processing is executed in Step S6 without the execution of the backlash acceleration correction for the speed command VCMD.

The following is a description of advantages provided by the backlash acceleration correction according to the present embodiment.

Figure 9:
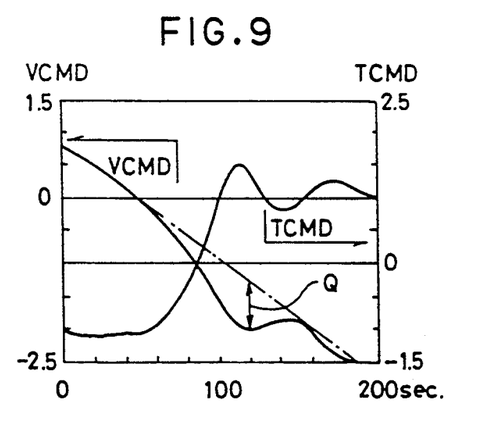
FIG. 9 is a graph showing changes of the speed command and the torque command obtained when the backlash acceleration correction is not effected.

As shown in FIG. 9, if cutting work is executed under center cutting conditions without undergoing the backlash acceleration correction, the speed command VCMD suddenly increases in its value immediately after its sign is inverted, as compared with an ideal speed command TCMD which linearly changes as indicated by the broken line. This sudden increase of the speed command is attributable to a reduction of the motor output torque, produced immediately after the start of the reverse rotation of the motor, to a value such that the torque cannot resist the static friction of the mechanical system which acts when the motor rotation is reversed. When the torque command TCMD and hence the motor output torque increase to values to resist the static friction as the speed command rapidly increases, thereafter, the positional deviation is reduced so that the speed command slowly changes. If the backlash acceleration correction is not executed, the reversal of the motor rotation is delayed, as indicated by symbol Q in FIG. 9, so that projections are formed on the machined surface of the workpiece.

Figure 10A:
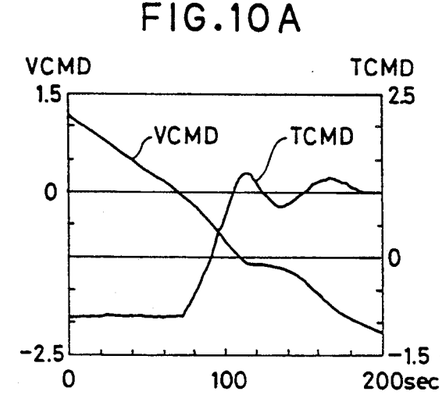
FIG. 10A is a graph showing changes of the speed command and the torque command obtained when conventional backlash acceleration correction is effected.
Figure 10B:
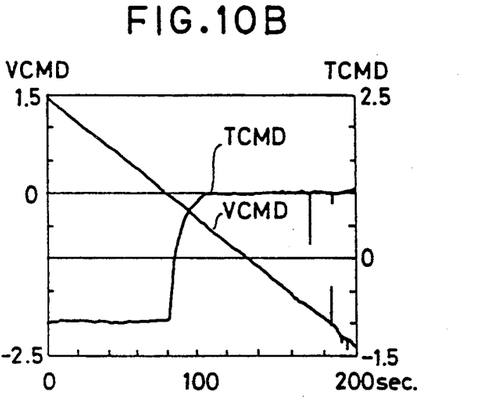
FIG. 10B is a graph, similar to FIG. 10A, showing the case in which the backlash acceleration correction according to the present invention is effected.

If the conventional backlash acceleration correction is executed under the same cutting conditions as the ones shown in FIG. 9 and with the backlash acceleration amount and the acceleration time adjusted to their respective optimum values, the speed command VCMD and the torque command TCMD change in the manner shown in FIG. 10A. If the backlash acceleration correction according to the aforementioned embodiment of the present invention is executed, in contrast with this, the speed command VCMD more linearly changes, as shown in FIG. 10B, and no projections are formed on the machined surface of the workpiece. Further, the torque command VCMD is subject to less variation.

Figure 11A:
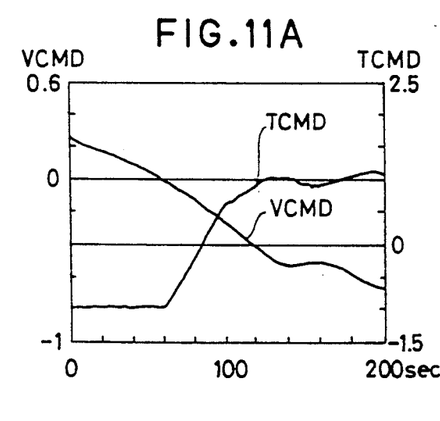
FIG. 11A is a graph, similar to FIG. 10A, showing the case in which the conventional correction is effected under different conditions.
Figure 11B:
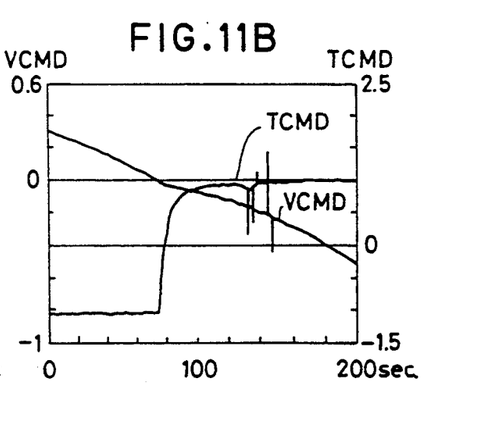
FIG. 11B is a graph, similar to FIG. 10B, showing the case in which the correction according to the present invention is effected under the same conditions as in the case of FIG. 11A.

Comparison between FIG. 11A, which shows changes of the speed command and the torque command obtained when the conventional backlash acceleration correction is executed with the cutting speed halves, and FIG. 11B associated with the present invention indicates that the speed command more linearly changes, and the variation of the torque is restrained, according to the present invention.

Figure 12A:
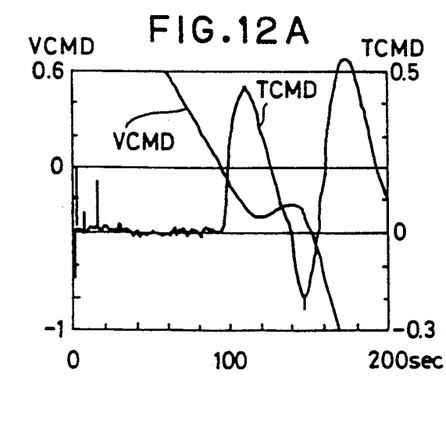
FIG. 12A is a graph, similar to FIG. 10A, showing the case in which the conventional correction is effected under further alternative conditions.
Figure 12B:
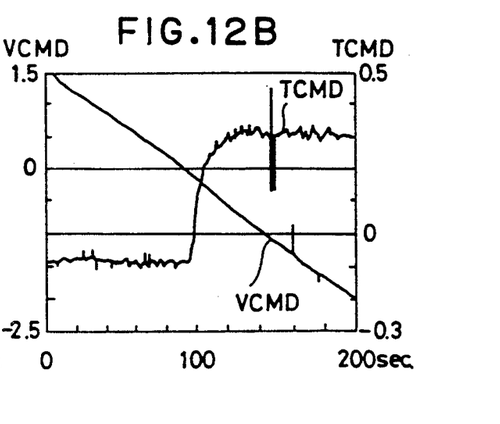
FIG. 12B is a graph, similar to FIG. 10B, showing the case in which the correction according to the present invention is effected under the same conditions as in the case of FIG. 12A.

If the conventional method is applied in a no-load state, the speed command greatly varies, as shown in FIG. 12A, so that projections and recesses are formed on the machined surface of the workpiece, and at the same time, the torque command considerably varies. According to the present invention, as shown in FIG. 12B, the variations of the speed command and the torque command can be eliminated.

The present invention is not limited to the embodiment described above, and various modifications may be effected therein.

In the above embodiment, for example, the present invention is applied to the machine tool for cutting work. However, the present invention may be applied to any of various machines which have one or more feed screws.

Although the cutting speed for the calculation of the backlash acceleration correction parameters k and T is estimated from the positional deviation in the foregoing embodiment, moreover, an actual cutting speed is used for that purpose if it is detectable. Alternatively, furthermore, the respective values of the parameters k and T corresponding to various cutting speeds may be previously calculated and loaded into a memory device so that the parameter values can be determined in accordance with the estimated or actual cutting speed.

I claim:

1. A servomotor control method for a servo system having a speed loop for obtaining an integral value in accordance with a speed command and an actual speed and arranged to control a servomotor for rotating a feed screw of a machine, said servomotor control method comprising the steps of:
    (a) determining a target value which is equal in magnitude to the integral value obtained at an instant immediately after reversal of a rotating direction of the feed screw, and which has a sign opposite to that of the integral value;

(b) repeatedly determining a backlash acceleration amount until a predetermined period has elapsed from the instant immediately after the reversal of the feed screw rotating direction, the backlash acceleration amount gradually changing from the integral value to said target value with passage of time after the instant immediately after the reversal of the feed screw rotating direction; and (c) repeatedly correcting, during the predetermined period, the speed command in accordance with said backlash acceleration amount.

2. A servomotor control method according to claim 1, wherein said method is applied to a servo system for cyclically executing speed loop processes, and wherein said step (b) comprises the substeps of:

(b1) determining the integral value in each of the speed loop processes within the predetermined period; and (b2) determining the backlash acceleration amount in each speed loop process on the basis of an intermediate target value which is obtained by subtracting the integral value obtained in each speed loop process from said target value.

3. A servomotor control method according to claim 2, wherein in said step (b2) the backlash acceleration amount is obtained by multiplying the intermediate target value by a predetermined coefficient.

4. A servomotor control method according to claim 3, wherein in said step (b2) the predetermined coefficient is proportional to a cutting speed used immediately after the reversal of the feed screw rotating direction.

5. A servomotor control method according to claim 3, further comprising applying said method to a servo system for cyclically executing a position loop process in accordance with a position command and an actual position, and determining the predetermined coefficient to be proportional to a square root of a positional deviation obtained when the sign of the position command is inverted.

6. A servomotor control method according to claim 3, wherein the predetermined period in said step (b1) is decided in accordance with the predetermined coefficient.

* * * * *